United States Patent

Basche

[11] Patent Number: 6,119,164
[45] Date of Patent: Sep. 12, 2000

[54] METHOD AND APPARATUS FOR DISTRIBUTING OVER A NETWORK UNSOLICITED INFORMATION TO A TARGETED AUDIENCE

[75] Inventor: Todd Basche, Los Altos, Calif.

[73] Assignee: Full Circle Software, Inc., Sunnyvale, Calif.

[21] Appl. No.: 08/842,624

[22] Filed: Apr. 15, 1997

[51] Int. Cl.[7] .................................................. G06F 15/16
[52] U.S. Cl. .......................... 709/229; 709/223; 709/224; 709/225
[58] Field of Search ...................... 395/200.59, 200.54, 395/200.55, 200.53; 709/229, 224, 225, 223

[56] References Cited

U.S. PATENT DOCUMENTS

| | | | |
|---|---|---|---|
| 5,307,354 | 4/1994 | Cramer et al. ............................... | 714/4 |
| 5,619,716 | 4/1997 | Nonaka et al. ........................ | 395/712 |
| 5,710,884 | 1/1998 | Dedrick ............................... | 395/200.47 |
| 5,717,923 | 2/1998 | Dedrick .................................... | 395/613 |
| 5,761,662 | 6/1998 | Dasan ........................................ | 707/10 |
| 5,784,563 | 7/1998 | Marshall et al. ........................ | 709/221 |
| 5,796,952 | 8/1998 | Davis et al. ............................. | 709/224 |
| 5,835,087 | 11/1998 | Hertz et al. .............................. | 345/327 |
| 5,835,911 | 11/1998 | Nakagawa et al. ...................... | 707/203 |
| 5,845,090 | 12/1998 | Collins, III et al. .................... | 709/221 |
| 5,960,204 | 9/1999 | Yinger et al. ............................ | 395/712 |

*Primary Examiner*—Zarni Maung
*Assistant Examiner*—Saleh Najjar
*Attorney, Agent, or Firm*—Gray Cary Ware & Freidenrich LLP

[57] ABSTRACT

In response to input received from an operator, a workstation fully performs programmed instructions to carry out operator requests represented by the input. In addition, the workstation also records profile information derived from data representing operator choices and sends that profile information to a server along a communications path such as a telephonic link to a publicly-accessible network. The server analyzes the profile information, generates display information in response to the profile information, and returns display information along the communications path to the workstation. In turn, the workstation presents the display information to the operator. In this manner, information customized according to profiles can be delivered to people and organizations most likely to be interested in the information content.

6 Claims, 3 Drawing Sheets

METHOD AND APPARATUS FOR DISTRIBUTING OVER A NETWORK UNSOLICITED INFORMATION TO A TARGETED AUDIENCE

TECHNICAL FIELD

The invention relates to the distribution of information to selected recipients over computer networks including publicly-accessible networks such as the Internet.

BACKGROUND ART

With the growing popularity of publicly-accessible computer networks such as the Internet, there is an increasing interest in developing ways to use such networks for distributing information to people and organizations most likely to be interested in the information content, referred to herein as a "targeted audience." The variety of information to be distributed is very broad, including public-interest notices and announcements, marketing and advertisements, and product-recall notices, for example.

One way in which information is distributed to a targeted audience on the Internet is by network sites often referred to as search engines. These sites enable a person to identify other sites on the Internet which are likely sources of desired information or services by presenting lists of sites which claim to have content matching keywords or search terms provided by the person. Many search engines also present selected advertisements and notices in response to search terms identified in advance which suggest the person is likely to be interested in the advertised product or service or in the subject of the notice.

Unfortunately, this method of distributing information suffers from several limitations. First, it depends on members of the targeted audience to use a search engine. Depending on the characteristics of the targeted audience, it is quite likely that large segments of this audience may not use search engines.

Second, it requires that members of the targeted audience use particular search engines. Information will not be delivered to a member of that audience who uses a search engine which is not set up to distribute that particular information. There are many search engines on the Internet and the number of search engine sites is likely to increase; therefore, this is likely to become a greater problem.

Third, this way of distributing information requires a person to specify pertinent keywords which have been identified in advance. If alternate terms are used, the information will not be delivered.

Fourth, a search engine cannot present information from competing sources with equal priority or visibility. If a list of potential sources is presented, for example, only one of the sources can be listed first.

DISCLOSURE OF INVENTION

It is an object of the present invention to provide for the distribution of information to a targeted audience over a computer network in a way that does not require members of that audience to use any search engine or to specify particular keywords or search terms identified in advance, and which avoids conflicts between competing interests.

According to one aspect of the present invention, a client workstation receives operator input and fully performs programmed instructions according to that input, records in a storage device profile information derived from data representing the operator choices, sends the profile information to a server, and generates a display in response to information received from the server that was customized in response to the profile information.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Figure 1:
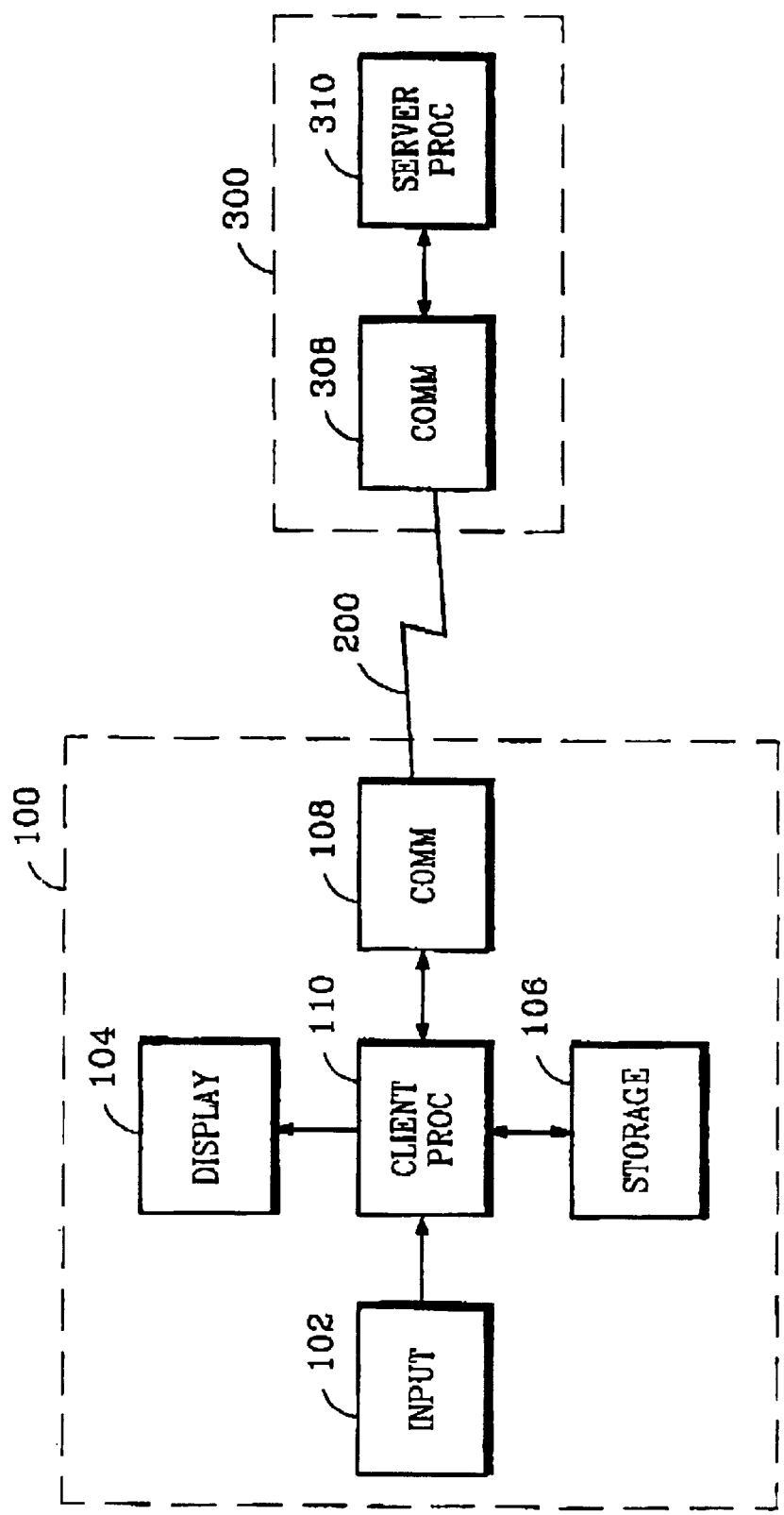
FIG. 1 is a general diagram of a client workstation coupled to a server by way of a communications path.

FIG. 1 illustrates client workstation 100 coupled to server 300 by way of a communications path 200. Client workstation 100 may be implemented in a number of ways including personal computers, work stations, or so called network computers. Communications path 200 may be implemented in a number of ways including a dial-up communication link or a dedicated communications link. Server 300 may also be implemented in a number of ways. The essential features are discussed in more detail below.

Figure 2:
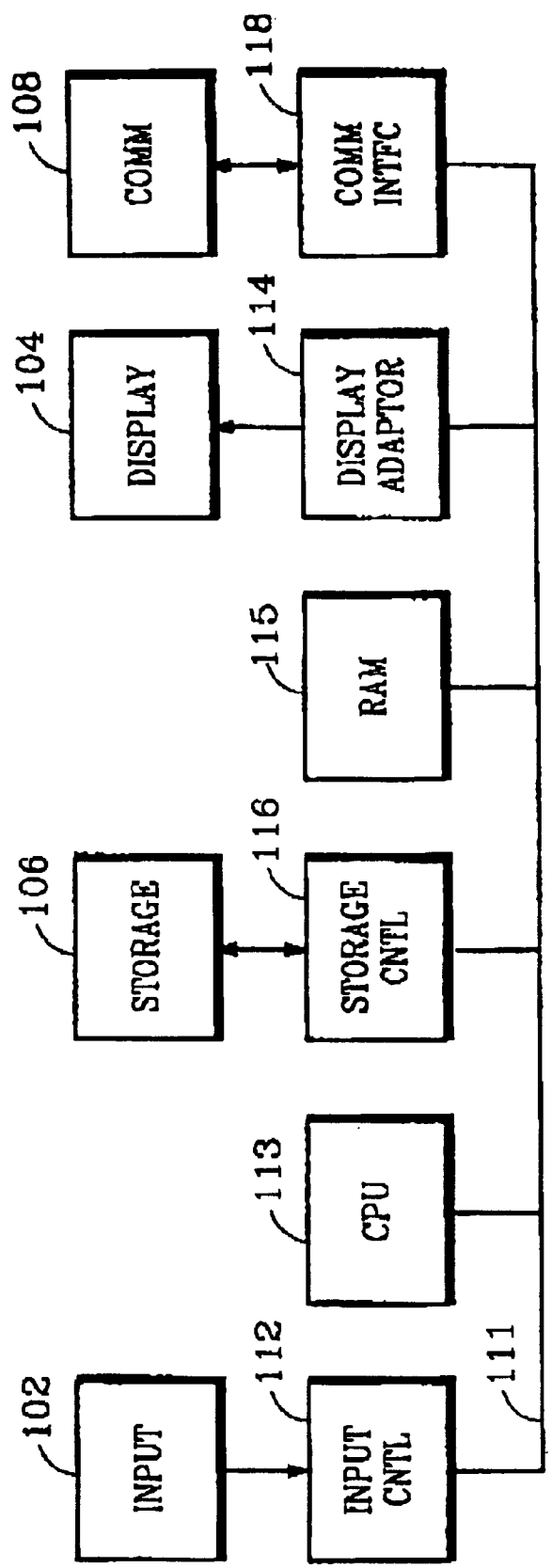
FIG. 2 is a functional block diagram of a typical personal computer system that may be used to implement a client workstation.

FIG. 2 is a functional block diagram of a typical personal computer that may be used to implement client workstation 100. CPU 113 provides computing resources and can be implemented by a microprocessor, for example. Input controller 112 provides an interface to an operator input device 102 such as a keyboard or mouse. Storage controller 116 provides an interface to a storage device 106 such as a magnetic disk drive or solid-state storage device. Display adaptor 114 provides an interface to a display 104 such as a video monitor. RAM 115 provides random access memory. Communication interface 118 couples to a communications device 108 such as a modem or a network interface. Server 300 may be implemented similarly.

As illustrated, all major functional components connect to bus 111 which may represent more than one physical bus. Although the architecture illustrated in the figure is considered typical for many personal computers, no particular architecture is required to practice the present invention. For example, input controller 112, CPU 113, and storage controller 116 may be physically remote from one another.

Figure 3:
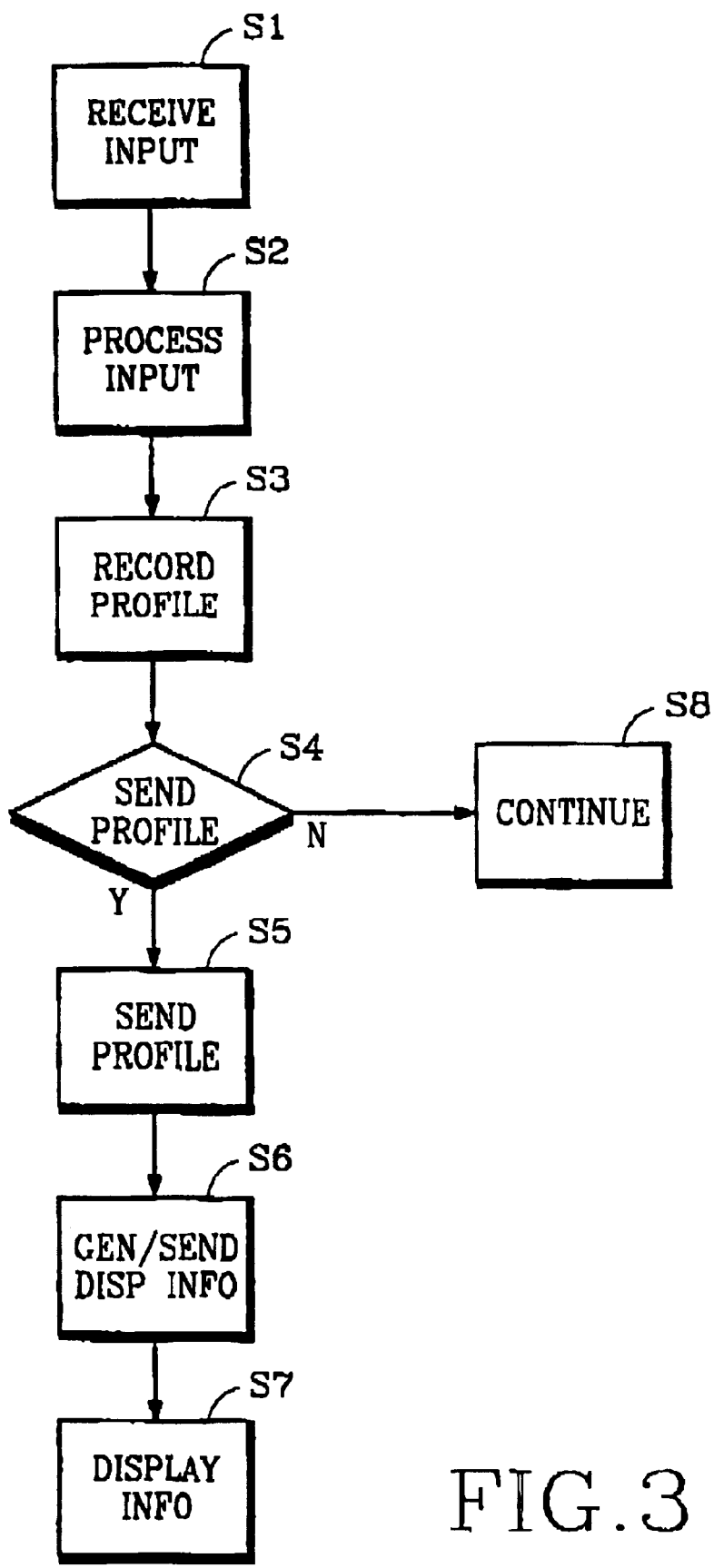
FIG. 3 is a flow diagram illustrating processing steps according to one embodiment of the present invention.

FIG. 3 is a flow diagram illustrating processing steps according to one aspect of the present invention. These processing steps may be implemented in a set of programmed instructions for execution by CPU 113, for example. The programmed instructions may be an integral part of an application such as text or graphics processing or data management, they may be incorporated into an application or a component of an operating system which monitors activities in other applications, or they may be incorporated into some hybrid of these arrangements.

In step S1 client workstation 100 receives input representing operator choices specified through input device 102. The input may be keystrokes from a keyboard or operations performed with a pointing device such as a mouse. The choices may be selections of programs to run or various options elected in the course of running one or more programs.

In step S2 the client workstation fully performs all processes according to the operator choices. In a program for manipulating images obtained from an optical scanner, for example, step 2 represents all of the processing required to carry out functions prescribed by operator choices such as rotating or annotating images, generating text by performing optical character recognition (OCR), or printing or faxing a document image.

In step S3 the client workstation records data representing a profile of operator choices using storage device 106. For example, the profile information may convey the number or nature of documents that have been processed by OCR or sent by fax, or it may convey the number and types of error messages generated by the program.

In step S4, using communications devices 108 and 308 and communications path 200, client workstation 100 exchanges information with server 300 and determines whether derived profile information is to be sent to the server. If profile information is to be sent, client workstation 100 sends the profile information to server 300 in step S5. If information is not to be sent, step S8 is performed instead.

In step S6, server 300 generates display information in response to the profile information and sends that information to client workstation 100 by way of communications devices 308 and 108 communications path 200.

In Step S7, using display device 104, client workstation 100 presents a display of the display information received from the server. It is anticipated that the display will generally be visual and/or aural but no particular type of display is critical.

The steps discussed above may be performed in various ways. For example, step S3 could be performed prior to preforming step S2. The determination in step S4 whether profile information is to be sent may be accomplished in a number of ways. Preferably, this determination is made in response to an inquiry received by the client workstation from the server asking if profile information is available. Alternatively, the client workstation may initiate the exchange by indicating to the server it has profile information to send.

Suppose a first operator at a client workstation regularly uses OCR to convert scanned images into editable text but hardly ever sends the images by fax. After establishing a communication link with a server, profile information conveying the frequent use of OCR would be sent to the server. In response, the server would send display information to the client workstation announcing fixes to defects in the OCR software, the availability of upgrades or new versions of OCR software, and the like. The server might not send any information relating to the use of fax software.

Suppose further a second operator at the same or a different client workstation regularly sends document images by fax but never uses OCR. In response to profile information, a server could send display information pertinent to faxing capabilities but would not send any information pertaining to OCR.

As these examples show, specific information can be distributed to a specified target audience in response to operator choices made during the course of using the client workstation and does not require that the operator interact with any particular search engine or specify any particular keywords or search terms.

What is claimed is:

1. A client node for presenting displays of unsolicited information customized according to operator preferences to the operator of the client node, the client node comprising:
   a first communications device connected to a remote server for communications with the remote server;
   an operator input device for receiving input from the user of the client node;
   a display device for displaying various information to the user of the client node;
   a first processing device coupled to said first communications device, said input device and said display device, wherein said first processing device further comprising means for automatically gathering profile information about the operator of the client node based on choices and activities indicated by the operator input device, means for determining if the profile information is to be sent to the remote server, and means for displaying the display information received from the remote server in response to the profile information, the display information including unsolicited information customized according to the user profile of the user of the client node, wherein the user profile information comprises the operator's choice of a software application being executed by the client node and wherein the unsolicited information comprises one or more of information about defect fixes for the particular software application and information about upgrades to the software application.

2. The client node of claim 1, wherein the user profile information comprises errors messages generated by one or more software applications being executed on the client node.

3. The client node of claim 1, wherein the user profile information comprises the operator's choice of features used in a software application.

4. A server for generating information for displays customized according to operator choices and activities on a client workstation, the server comprising:
   means for exchanging messages with a remote workstation to determine whether said workstation is to send profile information and, if so, receiving said profile information representing automatically gathered operator choices and activities, said profile information derived from data automatically collected in response to operator interactions with said workstation;
   means for generating unsolicited display information in response to said profile information;
   means for sending said unsolicited display information to said workstation, wherein the unsolicited display information is for generating a display on the remote workstation to display the unsolicited display information to the operator of the remote workstation; and
   wherein the user profile information comprises the operator's choice of a software application being executed by the client node and wherein the unsolicited information comprises one or more of information about defect fixes for the particular software application and information about upgrades to the software application.

5. The server of claim 4, wherein the user profile information comprises errors-messages generated by one or more software applications being executed on the client node.

6. The server of claim 4, wherein the user profile information comprises the operator's choice of features used in a software application.

* * * * *